(12) United States Patent
Wang et al.

(10) Patent No.: US 8,200,254 B2
(45) Date of Patent: Jun. 12, 2012

(54) METHOD FOR IMPROVING PAGING SUCCESS RATIO IN BROAD BANDWITH WIRELESS COMMUNICATION SYSTEM

(75) Inventors: Ning Wang, Shenzhen (CN); Wentao Zhou, Ylojarvi (CN)

(73) Assignee: ZTE Corporation, ShenZhen (CN)

( * ) Notice: Subject to any disclaimer, the term of this patent is extended or adjusted under 35 U.S.C. 154(b) by 219 days.

(21) Appl. No.: 12/809,787

(22) PCT Filed: Dec. 24, 2007

(86) PCT No.: PCT/CN2007/003743
§ 371 (c)(1),
(2), (4) Date: Jun. 21, 2010

(87) PCT Pub. No.: WO2009/079852
PCT Pub. Date: Jul. 2, 2009

(65) Prior Publication Data
US 2010/0273512 A1    Oct. 28, 2010

(51) Int. Cl.
*H04W 68/00* (2009.01)
*H04W 4/00* (2009.01)

(52) U.S. Cl. ...................... 455/458; 455/432.1

(58) Field of Classification Search .................. 455/458, 455/432.1, 432.3, 433, 440, 443, 456.1, 456.5, 455/456.6
See application file for complete search history.

(56) References Cited

U.S. PATENT DOCUMENTS

| | | | |
|---|---|---|---|
| 7,020,440 B2 * | 3/2006 | Watanabe et al. | 455/67.11 |
| 7,526,288 B2 * | 4/2009 | Eom et al. | 455/435.1 |
| 7,567,785 B2 * | 7/2009 | Tsai et al. | 455/186.1 |
| 8,068,846 B2 * | 11/2011 | Casati et al. | 455/456.1 |
| 2003/0040313 A1 * | 2/2003 | Hogan et al. | 455/435 |
| 2007/0191031 A1 * | 8/2007 | Mohanty et al. | 455/458 |
| 2007/0218926 A1 * | 9/2007 | Zhuang et al. | 455/466 |
| 2008/0032713 A1 * | 2/2008 | Yang | 455/458 |
| 2008/0084842 A1 * | 4/2008 | Xiang et al. | 370/329 |
| 2008/0096584 A1 * | 4/2008 | Xu et al. | 455/458 |
| 2008/0102789 A1 * | 5/2008 | Sung | 455/406 |
| 2008/0220769 A1 * | 9/2008 | Qi et al. | 455/426.1 |

FOREIGN PATENT DOCUMENTS

| | | |
|---|---|---|
| CN | 1567799 A | 1/2005 |
| CN | 1921684 A | 2/2007 |
| CN | 101022654 A | 8/2007 |
| WO | 2006071051 A1 | 7/2006 |

OTHER PUBLICATIONS

International Search Report, May 2008.

* cited by examiner

*Primary Examiner* — Brandon Miller
(74) *Attorney, Agent, or Firm* — Banner & Witcoff, Ltd.

(57) ABSTRACT

A method for increasing paging success ratio in a broadband wireless communication system, comprises: when a terminal determines that it has moved into an overlapping area of a plurality of paging groups including an original paging group, the terminal initiates a location updating flow to a current serving BS; an anchor paging controller updates location information of the terminal and includes the current serving BS and its adjacent cell BSs in a paging scope; after the location updating initiated in the overlapping area succeeds and before location updating for moving across paging groups succeeds, the terminal monitors a paging message according to paging parameters of the original paging group; and when the anchor paging controller is required to page the terminal, it initiates paging to a plurality of BSs including the current serving BS and its adjacent cell BSs according to the paging parameters of the original paging group.

21 Claims, 3 Drawing Sheets

METHOD FOR IMPROVING PAGING SUCCESS RATIO IN BROAD BANDWITH WIRELESS COMMUNICATION SYSTEM

TECHNICAL FIELD

The present invention relates to a mobile communication technology, and specifically to a method for increasing paging success ratio in a broadband wireless communication system.

BACKGROUND OF THE RELATED ART

Worldwide interoperability for microwave access (WiMAX) is a new generation broadband wireless communication technology. Compared with conventional 3G access technology, WiMAX has advantages such as in high rate, quality of service (QoS), and flexibility.

FIG. 1 is a diagram of the basic network structure of a WiMAX system, which comprises functional modules including a base station (BS), an access gateway (AGW), an authenticator functional module, a paging controller, and an authentication authorization accounting (AAA) module etc. Wherein, the paging controller and authenticator functional module are generally located in the AGW, and the paging controller can be classified into anchor paging controller and relay paging controller according to its function; the interface between the BS and the AGW or paging controller is R6 interface, and the interface between the relay paging controller and the anchor paging controller is R4 interface.

Idle mode is an important power saving mode in a WiMAX system, and when a terminal is in the idle mode, it can sleep in non-monitoring time slots, so that the endurance of the mobile terminal can be increased greatly. In the idle mode, a terminal reports information of the paging group to which it currently belongs to the paging controller by various location updating mechanisms. The common location updating mechanisms generally include periodical location updating and paging group location updating. A terminal in the idle mode needs to perform downlink synchronization firstly in each monitoring interval, and during the downlink synchronization, the terminal needs to scan a downlink channel description (DCD) message. According to the description in the WiMAX protocol, if the paging group list in the DCD message does not include the paging group to which the terminal currently belongs, the terminal considers that it has moved across paging groups, and triggers a location updating flow to report the latest paging group location information to the paging controller. When downlink data addressed to the terminal is sent to the AGW, the AGW instructs the anchor paging controller to perform paging, and the anchor paging controller may instruct, via a relay paging controller, all or part of the BSs in the paging group to which the terminal belongs send a paging broadcast message to the terminal, so as to instruct the terminal to receive the data upon exiting from the idle mode.

A flow of a terminal entering the idle mode, paging, and exiting from the idle mode is specified in detail in a standard of phase 3 by a network working group (NWG) subordinate to the WiMAX forum. According the description in the WiMAX protocol, for a terminal in mobile state, the paging controller may initiate a paging according to information of the paging group to which the terminal belongs reported by location updating.

FIG. 2 is a schematic diagram illustrating movement of a terminal in idle mode in a WiMAX system. BS1, BS2, and BS3 are managed by a paging controller, where BS1 belongs to paging group 1, BS3 belongs to paging group 2, and BS2 belongs to paging group 1 and paging group 2. The terminal enters the idle mode at BS1, and chooses paging group 1 as its current paging group. When the terminal moves from the coverage of BS1 to the coverage of BS2, location updating triggered by paging area updating will not be performed since BS2 also belongs to paging group 1; when the terminal moves swiftly from the coverage of BS2 to the coverage of BS3, the terminal under the new BS3 needs to firstly perform downlink synchronization, receive a DCD message, detect that it has moved across paging groups, and accordingly initiate a location updating flow. If paging of the terminal happens before the terminal performs the new location updating flow successfully, there will be a first time paging failure for the terminal, and the paging controller has to page the terminal by a subsequent paging retransmission message. In the worst case, if the paging controller has not received a location updating message from the terminal before paging times are depleted, paging of the terminal will fail.

SUMMARY OF THE INVENTION

The technical problem to be solved by the present invention is to provide a method for increasing paging success ratio in a broadband wireless communication system, so as to increase the success ratio of paging a terminal.

To solve the above technical problem, the present invention provides a method for increasing paging success ratio in a broadband wireless communication system, comprising the following steps of:

when a terminal determines that the terminal has moved into an overlapping area of a plurality of paging groups including an original paging group, the terminal initiating a location updating flow to a current serving base station;

in the location updating flow, an anchor paging controller updating location information of the terminal and including the current serving base station and adjacent cell base stations thereof in a paging scope;

after the location updating initiated in the overlapping area succeeds and before location updating for moving across paging groups succeeds, the terminal monitoring a paging message according to paging parameters of the original paging group; and when the anchor paging controller is required to page the terminal, the anchor paging controller initiating paging to a plurality of base stations including the current serving base station and adjacent cell base stations thereof according to the paging parameters of the original paging group.

Furthermore, the above method may also comprise:

in the location updating flow initiated in the overlapping area, the anchor paging controller adding information of paging groups other than the original paging group in the plurality of paging groups into the location information of the terminal; and after the location updating initiated in the overlapping area succeeds and before the location updating for moving across paging groups succeeds, when the anchor paging controller is required to page the terminal, the anchor paging controller initiating paging to base stations in the plurality of paging groups according to the paging parameters of the original paging group.

Furthermore, the above method may also comprise:

in the location updating flow initiated in the overlapping area, the anchor paging controller adding information for identifying the current serving base station of the terminal and the adjacent cell base stations thereof into the location information of the terminal; and after the location updating initiated in the overlapping area succeeds and before the location updating for moving across paging groups succeeds, when the anchor paging controller is required to page the terminal, the anchor paging controller initiating paging to the base station in the original paging group and said adjacent cell base stations according to the paging parameters of the original paging group.

Furthermore, the above method may divide into:

(a) the terminal moving from a base station $BS_A$ belonging to a paging group A to coverage of another base station $BS_{AB}$; if determining that the terminal is currently in an overlapping area of the original paging group A and a paging group set B including one or more new paging groups according to a monitored downlink broadcast message from the current serving base station $BS_{AB}$, then the terminal triggering a location updating flow;

(b) in the location updating flow, the base station $BS_{AB}$ sending a location updating request message to the anchor paging controller of the terminal, and after the anchor paging controller receives the location updating request message, the anchor paging controller adding information of the paging group included in the paging group set B into the location information of the terminal, while retaining an identification and paging parameters of the paging group A;

(c) after the location updating initiated in the overlapping area succeeds and before the terminal initiates the location updating for moving across paging groups and the location updating for moving across paging groups succeeds, the terminal still monitoring the paging message according to the paging parameters of the paging group A, and when the anchor paging controller is required to page the terminal, the anchor paging controller initiating paging to the base station in the paging group A and the base station in the paging group included in the paging group set B recorded in the location information of the terminal according to the paging parameters of the paging group A.

Furthermore, the above method may also comprise:

in the step (b), adding a parameter of paging group identifications (PGIDs) into the location updating request message sent by the base station $BS_{AB}$, the parameter including at least the identification of the paging group included in the paging group set B, and after the anchor paging controller receives the location updating request message, the anchor paging controller adding the identification of the paging group included in the paging group set B into the location information of the terminal; or in the step (b), the location updating request message sent by the base station $BS_{AB}$ not including the identification of paging group B, and when the anchor paging controller determines that the base station $BS_{AB}$ belongs to both the original paging group A and the paging group set B according to information of paging groups to which the base station belongs, or when a relay paging controller for delivering messages between the base station $BS_{AB}$ and the anchor paging controller determines which paging groups the base station $BS_{AB}$ belongs to and informs the anchor paging controller, the anchor paging controller adding the identification of the paging group included in the paging group set B into the location information of the terminal.

Furthermore, the above method may divide into:

(a) the terminal moving from a base station $BS_A$ belonging to a paging group A to coverage of another base station $BS_{AB}$, and if determining that the terminal is currently in an overlapping area of a plurality of paging groups including the original paging group A according to a monitored downlink broadcast message from the current serving base station $BS_{AB}$, then the terminal triggering a location updating flow;

(b) in the location updating flow, the base station $BS_{AB}$ sending a location updating request message to the anchor paging controller of the terminal, and after the anchor paging controller receives the location updating request message, the anchor paging controller adding information of the base station $BS_{AB}$ and adjacent cell base stations thereof into the location information of the terminal, while retaining an identification and paging parameters of the paging group A; and (c) after the location updating initiated in the overlapping area succeeds and before the terminal initiates the location updating for moving across paging groups and the location updating for moving across paging groups succeeds, the terminal still monitoring the paging message according to the paging parameters of the paging group A, and when the anchor paging controller is required to page the terminal, the anchor paging controller initiating paging to the base station in the paging group A and the adjacent cell base stations of the base station $BS_{AB}$ according to the paging parameters of the paging group A.

Furthermore, the above method may also comprise:

in the step (b), adding a parameter of adjacent cell base station identifications (BSIDs) into the location updating request message sent by the base station $BS_{AB}$, the parameter including at least adjacent cell BSIDs of the base station $BS_{AB}$, and after the anchor paging controller receives the location updating request message, the anchor paging controller adding said adjacent cell BSIDs into the location information of the terminal; or in the step (b), the location updating request message sent by the base station $BS_{AB}$ not including adjacent cell BSIDs of the base station $BS_{AB}$, and when the anchor paging controller acquires the adjacent cell BSIDs of the base station $BS_{AB}$ by searching according to a topological relationship of base stations, or when a relay paging controller for delivering messages between the base station $BS_{AB}$ and the anchor paging controller acquires the adjacent cell BSIDs of the base station $BS_{AB}$ by searching and informs the anchor paging controller, the anchor paging controller adding the identification of the base station $BS_{AB}$ and the adjacent cell BSIDs thereof into the location information of the terminal.

Furthermore, the above method may also comprise:

when the terminal moves into coverage of another base station, the terminal monitoring a downlink broadcast message from the current serving base station, and if determining that there are identifications of a plurality of paging groups including the original paging group in a paging group list in the downlink broadcast message, then determining that the terminal is currently in an overlapping area of a plurality of paging groups including a paging group A, and then triggering a location updating flow actively.

Furthermore, the above method may also comprise:

after moving from said overlapping area to coverage of a base station not belonging to the original paging group, the terminal initiating a location updating flow for moving across paging groups, and in the location updating flow, the anchor paging controller updating the paging group and paging parameters of the terminal with the paging group to which the current serving base station belongs and paging parameters thereof; and after the location updating succeeds, the terminal monitoring the paging message according to the paging parameters of the new paging group, and when the anchor paging controller pages the terminal, the anchor paging controller initiating paging to the base station in the new paging group according to the paging parameters of the new paging group.

Furthermore, the above method may have the following features:

when the anchor paging controller pages the terminal, the paging message is sent in a single step in which a part of the base stations in the paging scope are paged at one time, or the paging message is sent in multiple steps in which all base stations in the paging scope are paged at one time.

Furthermore, the above method may have the following features: the location updating flow triggered by the terminal in the overlapping area divides into the following steps of:

the terminal sending a ranging message to the current serving base station, and triggering the location updating flow;

after receiving the ranging message, the current serving base station sending a location updating request message to the anchor paging controller directly or via a relay paging controller;

after receiving the location updating request message, the anchor paging controller returning a location updating response message to the current serving base station directly or via the relay paging controller, updating the location information of the terminal, and including the current serving base station and the adjacent cell base stations thereof in the paging scope, while retaining the identification and paging parameters of the original paging group of the terminal;

after receiving the location updating response message, the current serving base station returning a location updating acknowledgment message to the anchor paging controller, and returning a result of the location updating to the terminal through a ranging response message.

Furthermore, the above method may have the following features: the method is applied in a worldwide interoperability for microwave access (WiMAX) system.

In the technical scheme of the present invention, the location of the terminal is tried to be determined in advance, and each time the terminal is in a overlapping area of paging groups, an updating flow is triggered and location updating is performed, which ensures that the paging parameters at the network side can be updated timely and thus increases greatly the success ratio of paging the terminal, and further ensures the reliability of the paging scope and avoids a paging broadcast storm caused by paging in a too large area.

PREFERRED EMBODIMENTS OF THE PRESENT INVENTION

Figure 1:
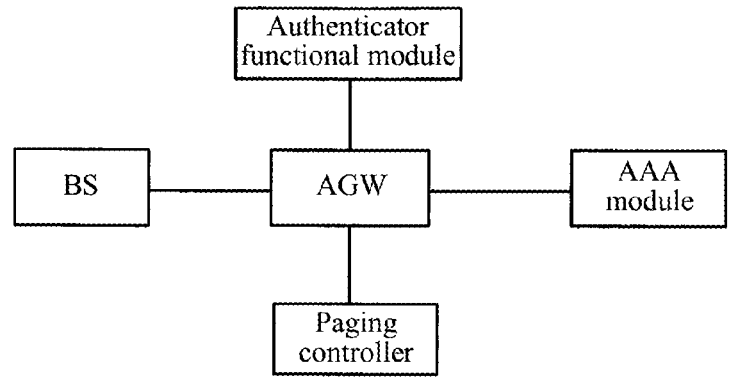
FIG. 1 is a diagram of the basic network structure of a WiMAX system in the prior art.
Figure 2:
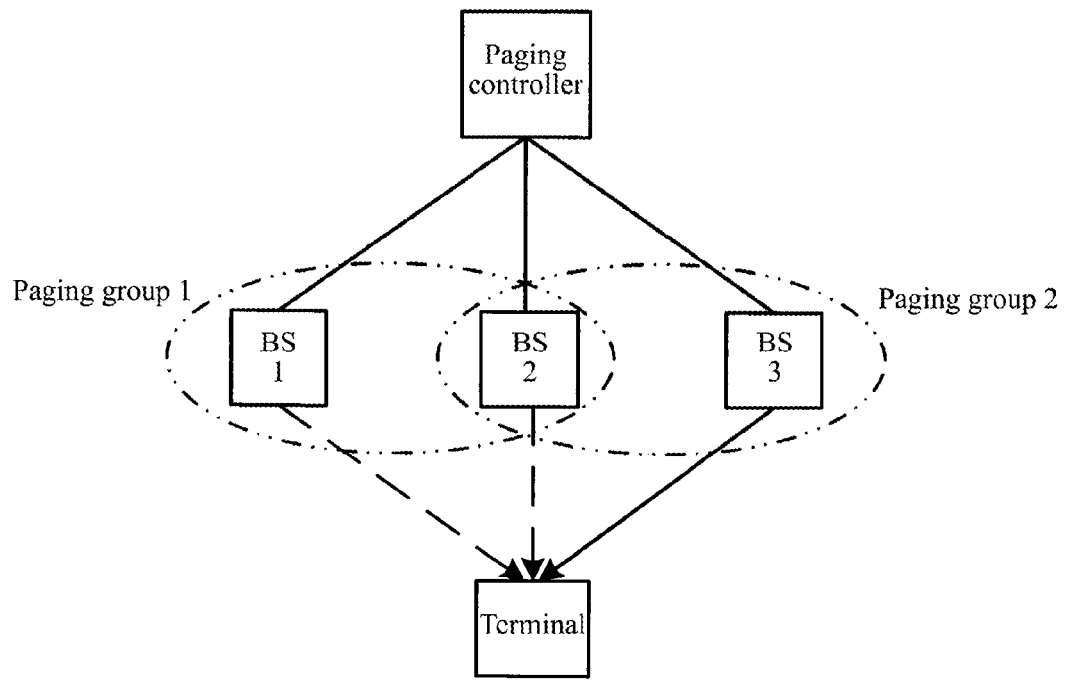
FIG. 2 is a schematic diagram illustrating movement of a terminal in idle mode in a WiMAX system in the prior art.

Preferred embodiments of the present invention will be described in detail with reference to FIG. 3 and FIG. 4 and in conjunction with the scenario shown in FIG. 2.

A terminal in idle mode moves gradually from the coverage of BS1 to the overage of BS2 (within the overlapping area of paging group 1 and paging group 2, and also a border area of paging group 1), and then moves from the coverage of BS2 to the overage of BS3. In order to increase paging success ratio, a possible location of the terminal is tried to be determined in advance, and paging is implemented on the premise that the location updating flow and paging flow will not be affected.

The method for increasing paging success ratio in a broadband wireless communication system provided by the present invention includes two preferred embodiments.

Embodiment 1

Figure 3:
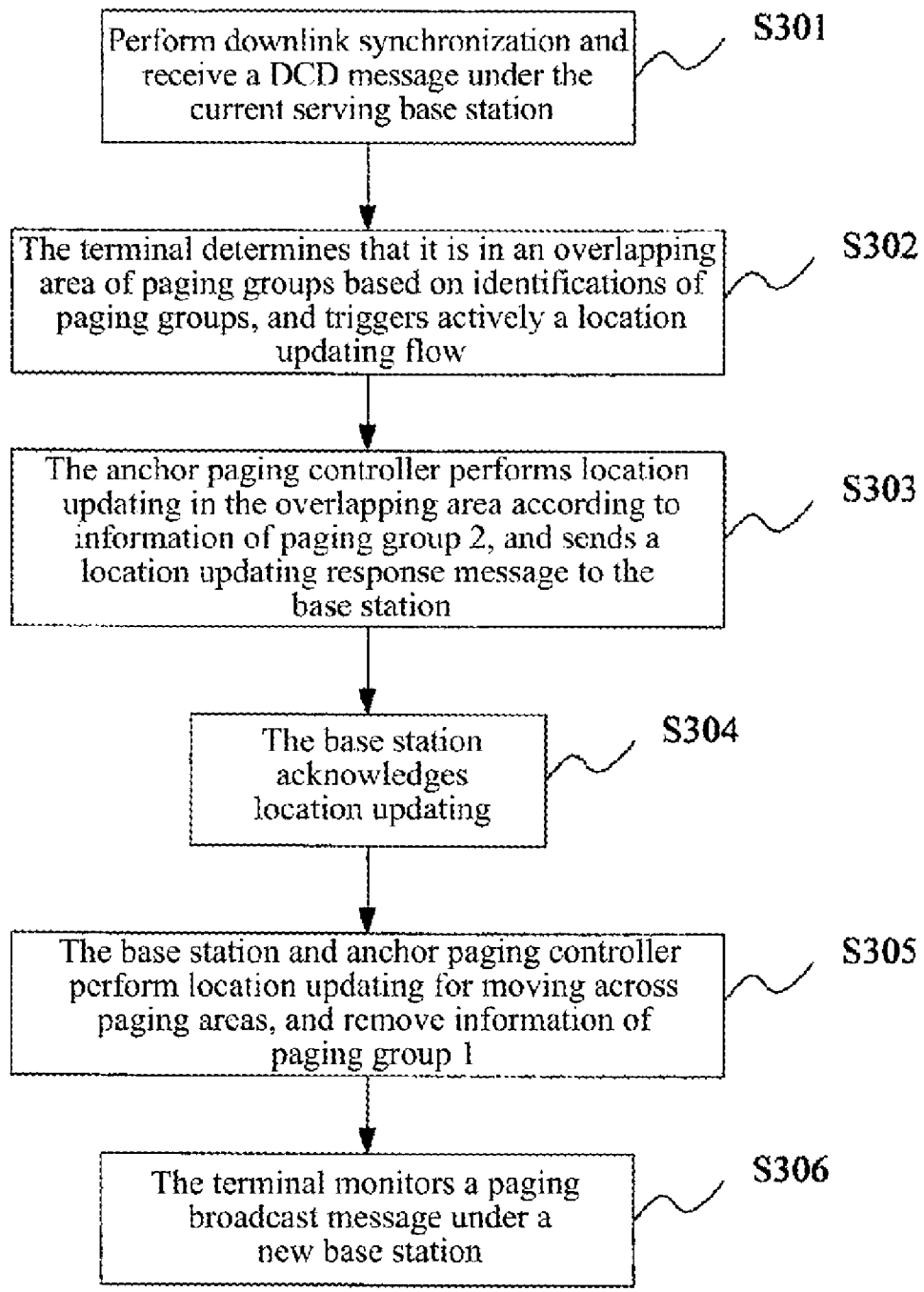
FIG. 3 is a flow chart of preferred embodiment 1 of the present invention.

With reference to FIG. 3, in this embodiment, paging group identifications (PGIDs) are utilized to determine the current location of a terminal, and corresponding location updating is performed.

Step S301, a terminal enters the idle mode in the coverage of BS1, chooses the BS1 as the current serving BS of the terminal, performs downlink synchronization, and receives a DCD message; a paging controller designates the terminal to belong to paging group 1 currently, and designates corresponding paging parameters including at least a paging cycle (PAGEING_CYCLE), a paging offset (PAGING OFFSET), and a paging interval length;

Under the BS1, the terminal only finds the PGID of the paging group 1 in the DCD message, thus the terminal does not trigger a location updating flow.

Step S302, when moving into the coverage of BS2, the terminal monitors a downlink broadcast message, and if the terminal determines that it has entered the overlapping area of two paging groups, the terminal initiates a location updating flow to the BS2, and the BS2 reports information of the paging group 2 to the anchor paging controller of the terminal;

After moving into the coverage of the BS2, the terminal sets the serving BS to the BS2, and wakes up in a paging monitoring interval to monitor a downlink broadcast message. Before starting the monitoring, the terminal needs to firstly perform downlink synchronization and receive a DCD message, and if there is the PGID of paging group 1 and a PGID of other paging group in a paging group list in the DCD message, the terminal considers that it is at the border area of paging areas, that is, the terminal is in the overlapping area of the paging group 1 and paging group 2, since the PGID of the paging group 2 does not belong to the paging group 1 to which the terminal belongs currently. Of course, a BS may acquire information of the paging group to which the BS2 belongs from other downlink broadcast message such as MOB-NBR-ADV or MOB-PAG-ADV message.

Then the terminal may trigger a location updating flow actively, or may trigger a location updating flow periodically by a location updating timer (the former way is recommended). The terminal may trigger location updating by a ranging message.

After receiving the ranging message, the BS2 sends a location updating request message (R6 interface location updating request message) to the anchor paging controller of the terminal, where the location updating request message contains information of the paging group 2 (including the PGID of the paging group 2), and the R6 interface location updating request message used in this embodiment is shown in table 1. A parameter "PGIDs" (paging group identifications) is added into the original location updating request to indicate the paging group to which the terminal belongs currently. Since the original parameter "Paging Information" in the message can indicate information of paging group 1, the newly added parameter "PGIDs" may only include the identification of paging group 2, i.e., it may not include the paging group to which the terminal belongs. Of course, the newly added parameter "PGIDs" may include both the identification of paging group 1 and that of paging group 2.

TABLE 1

R6 interface location updating request message

| Parameters | Description | Required/Optional | Interpretation |
|---|---|---|---|
| BS ID | Base station identification | Required | Indicating the identification of the base station where the terminal performs location updating |
| PGIDs | Paging group identifications | Optional | Paging group identifications of the base station where the terminal performs location updating (the paging group to which the terminal belongs is not included) |
| Anchor PC ID | Anchor paging controller identification | Required | The anchor paging controller identification carried in air interface unregistering request message |
| Authentication Indication | Indication of whether the source base station has security information for checking RNG-REQ message | Required | 0: no authentication information<br>1: having authentication information |
| Anchor PC Relocation Destination | Anchor paging controller that requests updating | Optional | Identification of the anchor paging controller required to be relocated |
| Paging Information | Paging information | Optional | The paging parameters include: PAGING_CYCLE, PAGING OFFSET and Paging Group ID. The base station may provide recommended values for the paging cycle and paging offset of the terminal. |
| Network Exit Indicator | This parameter indicates that the terminal is currently shutting down. | Optional | This parameter is used for shut-down location updating. |

If there is no direct physical link connecting the BS2 and the anchor paging controller, the BS2 has to send location updating request messages to the anchor paging controller via the relay paging controller, and those location updating request messages include a R4 interface location updating request message and a R6 interface location updating request message. Wherein, content of the R6 interface location updating request message is shown in table 1 and content of the R4 interface location updating request message is shown in table 2. The parameter "PGIDs" is also added into the R4 interface location updating request message, it includes the identification of paging group 2, and may certainly also include the identification of paging group 1.

TABLE 2

R4 interface location updating request message

| Parameters | Description | Required/Optional | Interpretation |
|---|---|---|---|
| BS ID | Base station identification | Required | Indicating the identification of the base station where the terminal performs location updating |
| PGIDs | Paging group identifications | Optional | Paging group identifications of the base station where the terminal performs location updating (the paging group to which the terminal belongs is not included) |
| Anchor PC Relocation Destination | Anchor paging controller that requests updating | Optional | Identification of the anchor paging controller required to be relocated |
| Paging Information | Paging information | Optional | The paging parameters include: PAGING_CYCLE, PAGING OFFSET and Paging Group ID. The base station may provide recommended values for the paging cycle and paging offset of the terminal. |
| Network Exit Indicator | This parameter indicates that the terminal is currently shutting down. | Optional | This parameter is used for shut-down location updating. |

Note that the parameter PGIDs may not be added into the above R6 and R4 interface location updating request messages, and in that case, the anchor paging controller or the relay paging controller is required to record a corresponding relationship between the BS and the paging groups. As such, the anchor paging controller or the relay paging controller may acquire the paging groups to which the BS2 belongs, i.e. paging group 1 and paging group 2, by searching according to the BS2 that reports the location updating message, and may then determine that the terminal has moved into the overlapping area of paging group 1 and paging group 2. Accordingly, the anchor paging controller may add the PGID of the paging group 2 into the paging group information in the location information of the terminal. Herein, if the determination is made by the relay paging controller, the relay paging controller needs to inform the anchor paging controller of the information of the paging group 2 such as the identification of paging group 2.

Step S303, after receiving the location updating request message, the anchor paging controller adds the identification of paging group 2 in the parameter PGIDs of the location updating request message into the paging group information in the location information of the terminal, while keeping the paging group to which the terminal belongs and the paging parameters unchanged, and then returns a location updating response message to the BS2 directly or via the relay paging controller;

When the terminal moves into the coverage of BS2, as the terminal has not left the paging group 1, the location updating at the network side will not change the fact that the terminal currently belongs to the paging group 1, but only adds the identification of the paging group 2 into the location information of the terminal to assist locating. The terminal still belongs to the paging group 1, and the paging parameters of the terminal are unchanged. If the location updating fails, the paging controller will do nothing but return a location updating failure response, and waits for a next location updating flow.

Step S304, after receiving the location updating response message, the BS2 returns a location updating acknowledgment message to the anchor paging controller directly or via the relay paging controller, and returns a result of the location updating to the terminal through a ranging response message at the air interface;

Step S305, the terminal leaves the BS2 and moves into the coverage of BS3, then it enters the coverage of paging group 2, and triggers a location updating flow for moving across paging groups;

After moving into the coverage of the BS3, the terminal performs downlink synchronization and receives a DCD message from the BS3. If the PGID of the paging group 1 is not found in the DCD message, which only includes the identification of the paging group 2, it indicates the terminal has left the paging group 1 and already moved across paging groups, then the terminal will trigger a location updating flow for moving across paging groups. The location updating flow is the same as that in the current standard, and the original standard message may be used. In the flow, the anchor paging controller updates the paging group to which the terminal belongs and the paging parameters with the paging group 2 and paging parameters of paging group 2, and meanwhile deletes information of paging group 1. The specific process of the flow is omitted here for simplicity.

After the location updating initiated by the terminal under the BS2 succeeds, and before the location updating for moving across paging groups initiated by the terminal under the BS3 succeeds, when the AGW receives data addressed to the terminal, the AGW instructs, by an internal message, the anchor paging controller of the terminal to initiate a paging flow, and the anchor paging controller sends a paging message to BSs in paging group 1 and paging group 2 respectively according to the identifications of the two paging groups recorded in the location information of the terminal. Since the terminal still belongs to paging group 1, the anchor paging controller still uses the paging parameters of paging group 1 to send the paging message. At the terminal side, since the location updating initiated by the terminal after moving into the coverage of BS2 did not change the paging group to which the terminal belongs, the terminal still monitors a paging message under the BS2 or BS3 according to the paging parameters of paging group 1 before the location updating for moving across paging groups succeeds. Thus, even though the terminal has entered the coverage of BS3, it can still be paged successfully, and thereby the paging success ratio is improved.

In particular, the paging message (may be a broadcast message) may be sent in a single step or multiple steps. When it is sent in a single step, the paging controller sends the page message at one time to all the BSs in the paging groups recorded. When it is sent in multiple steps, the paging controller sends the paging message at multiple times to the BSs in the paging groups recorded. After receiving the paging message from the paging controller, the BSs send the paging message at air interfaces according to the paging parameters indicated by the paging controller. In this process, if the paging controller receives a paging access message from the terminal, it no more sends a paging message in subsequent process.

The terminal exits from the idle mode and starts a paging access flow if the paging broadcast message indicates that it is paged.

Step S306, after the location updating for moving across paging groups succeeds, when the anchor paging controller needs to page the terminal, it sends a paging message to the BSs in the paging group 2 according to paging parameters of the paging group 2, and the terminal monitors the paging message under BS3 according to the paging parameters of the paging group 2.

The processing then is consistent with the current standard, and will not be repeated here.

Embodiment 2

Figure 4:
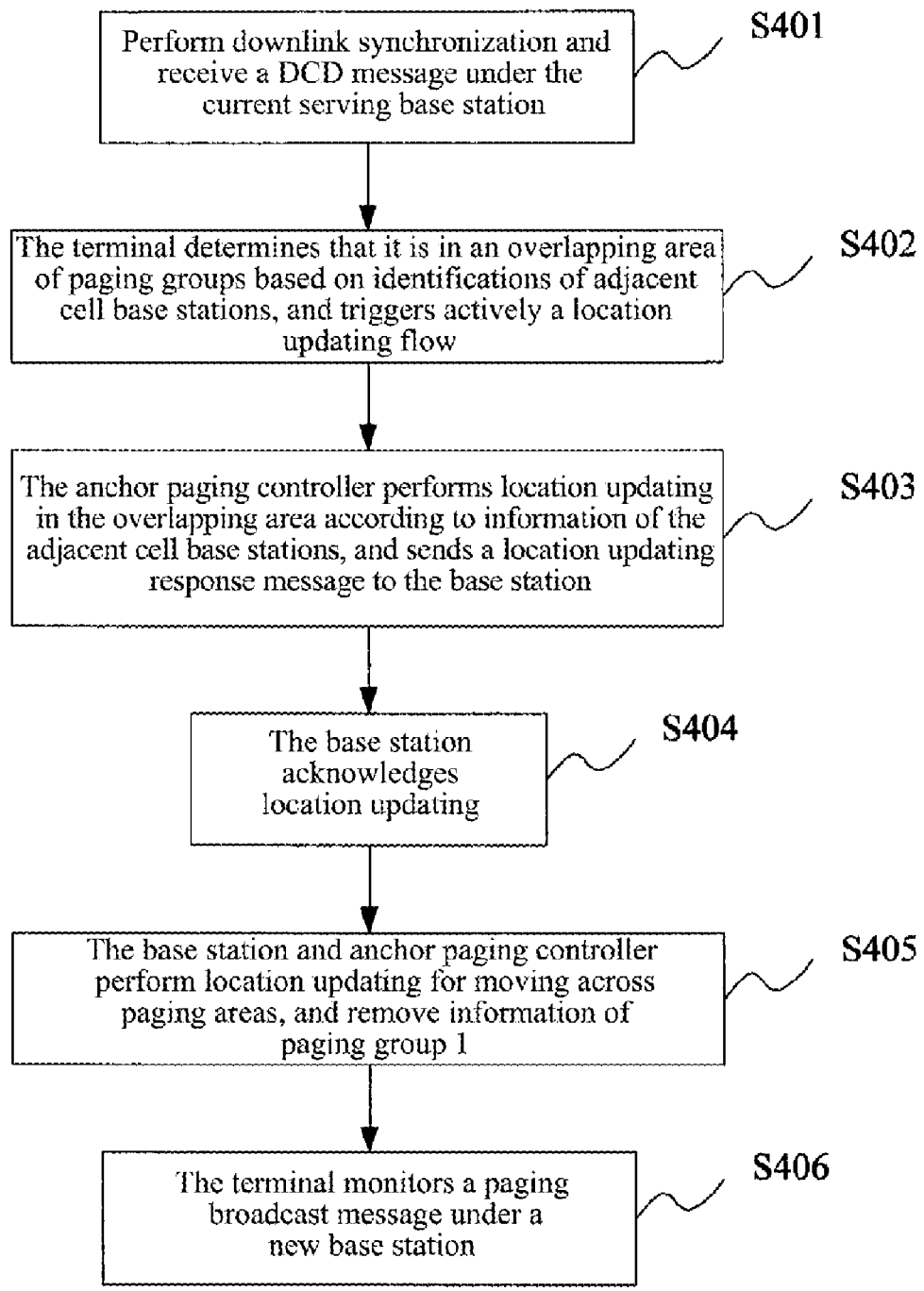
FIG. 4 is a flow chart of preferred embodiment 2 of the present invention.

With reference to FIG. 4, in this embodiment, a BS reports adjacent cell BS identifications (BSIDs) after initiating location updating at the border area of paging groups, and when an anchor paging controller needs to page a terminal, it sends a paging message to the BS where the terminal is located and its adjacent cell BSs.

Step S401, a terminal enters the idle mode under BS1, and chooses the BS1 as its preferred BS; the terminal can perform downlink synchronization and receive a DCD message in the coverage of the BS1, and a paging controller designates the terminal to belong to paging group 1 currently and designates corresponding paging parameters;

Step S402, when the terminal moves into the coverage of BS2, the terminal monitors a downlink broadcast message, and if it determines that it has entered an overlapping area of two paging groups, the terminal initiates a location updating flow to the BS2; then the BS2 reports information of adjacent cell BSs to the anchor paging controller of the terminal;

Similarly, the terminal may determine that it has entered the overlapping area of two paging groups according to the paging group identifications in the DCD message, and thus trigger a location updating flow.

When performing location updating for the terminal, the BS2 sends a R6 interface location updating request message to the anchor paging controller. The R6 interface location updating request message is shown in table 3, in which a parameter, namely adjacent cell BS identifications (BSIDs) of the BS where the terminal performs location updating, which is identifications of BS1 and BS3 herein, is added. The identification of BS2 has been defined in the message.

If there is no direct physical link connecting the BS2 and the anchor paging controller, the BS2 may send location updating request messages, including a R4 interface location updating request message and a R6 interface location updating request message, to the anchor paging controller via a relay paging controller. The content of the R6 interface location updating request message is shown in table 3, and the content of the R4 interface location updating request message is shown in table 4, into which adjacent cell BSIDs of the BS where the terminal performs location updating is also added.

TABLE 3

R6 interface location updating request message

| Parameters | Description | Required/Optional | Interpretation |
| --- | --- | --- | --- |
| BS ID | Base station identification | Required | Indicating the identification of the base station where the terminal performs location updating |
| Adjacent Cell BSIDs | Identifications of adjacent cell BSs | Optional | Identifications of adjacent cell BSs of the BS where the terminal performs location updating |
| Anchor PC ID | Anchor paging controller identification | Required | The anchor paging controller identification carried in air interface unregistering request message |
| Authentication Indication | Indication of whether the source base station has security information for checking RNG-REQ message | Required | 0: no authentication information 1: having authentication information |
| Anchor PC Relocation Destination | Anchor paging controller that requests updating | Optional | Identification of the anchor paging controller required to be relocated |
| Paging Information | Paging information | Optional | The paging parameters include: PAGING_CYCLE, PAGING OFFSET and Paging Group ID. The base station may provide recommended values for the paging cycle and paging offset of the terminal. |
| Network Exit Indicator | This parameter indicates that the terminal is currently shutting down. | Optional | This parameter is used for shut-down location updating. |

TABLE 4

R4 interface location updating request message

| Parameter | Description | Required/Optional | Interpretation |
| --- | --- | --- | --- |
| BS ID | Base station identification | Required | Indicating the identification of the base station where the terminal performs location updating |
| Adjacent Cell BSIDs | Identifications of adjacent cell BSs | Optional | Identifications of adjacent cell BSs of the BS where the terminal performs location updating |
| Anchor PC Relocation Destination | Anchor paging controller that requests updating | Optional | Identification of the anchor paging controller required to be relocated |
| Paging Information | Paging information | Optional | The paging parameters include: PAGING_CYCLE, PAGING OFFSET and Paging Group ID. The base station may provide recommended values for the paging cycle and paging offset of the terminal. |
| Network Exit Indicator | This parameter indicates that the terminal is currently shutting down. | Optional | This parameter is used for shut-down location updating. |

Note that the parameter adjacent cell BSIDs may not be added into the R6 and R4 interface location updating request messages, and in that case, the anchor paging controller or relay paging controller is required to record a topological relationship of BSs. As such, the anchor paging controller or relay paging controller may acquire the adjacent cell BSs of BS2 by searching according to the BS2 that reports the location updating message, and accordingly the anchor paging controller may add the identifications of the adjacent cell BSs into the location information of the terminal. Herein, if the relay paging controller acquires the adjacent cell BSs of BS2, the relay paging controller needs to notify the anchor paging controller of the adjacent cell BSIDs.

Step S403, after receiving the location updating request message, the anchor paging controller adds the identification of the BS2 and the identifications of adjacent cell BSs of the BS2 into the location information of the terminal, while keeping the paging group to which the terminal belongs and the paging parameters unchanged, and returns a location updating response message to the BS2 directly or via the relay paging controller;

When the terminal moves into the coverage of the BS2, the location updating at network side does not change the paging group to which the terminal currently belongs since the terminal has not left paging group 1, but only adds the identifications of the BS2 and its adjacent cell BSs into the location information of the terminal to assist locating. The terminal still belongs to the paging group 1, and the paging parameters of the terminal are unchanged. The location information of the terminal may include information of the paging group to which the terminal belongs, the BS where the terminal is located, and information of the adjacent cells etc.

Step S404, after receiving the location updating response message, the BS2 returns a location updating acknowledgment message to the anchor paging controller directly or via the relay paging controller, and returns a result of the location updating to the terminal through a ranging response message at the air interface;

Step S405, the terminal leaves the BS2 and moves into the coverage of BS3, then enters the coverage of paging group 2, and triggers a location updating flow for moving across paging groups;

Similarly, the terminal may determine that it has moved across paging groups according to the PGID in the DCD message from BS3. The location updating flow for moving across paging groups may be the same as the current standard. In the flow, the anchor paging controller may update the paging group to which the terminal belongs and the paging parameters with the paging group 2 and paging parameters of paging group 2, and may also update the identification of the BS where the terminal is located and the identifications of the adjacent cell BSs in the location information of the terminal After the location updating initiated by the terminal under BS2 succeeds, and before the location updating for moving across paging groups initiated by the terminal under BS3 succeeds, when the AGW receives data addressed to the terminal, it instructs, by an internal message, the anchor paging controller of the terminal to initiate a paging flow, and the anchor paging controller sends a paging message to at least the BS where the terminal is located and the adjacent cell BSs, using paging parameters of paging group 1. The terminal still monitors the paging message under the BS2 or BS3 according to paging parameters of paging group 1. Therefore, even though the terminal has entered the coverage of the BS3, it can still be paged successfully, and thereby paging success ratio is increased.

The above processing can be regarded as temporarily extending the BSs included in the paging group 1 by adding the BS3 into the paging group 1, for the terminal. As such, the terminal can be paged successfully. As described above, the paging can be implemented in a single step or multiple steps. If it is implemented in a single step, the paging message should be sent to all the BSs in the paging group 1 and the BS3; and if it is implemented in multiple steps, the paging message may be sent to the BS where the terminal is located and the adjacent cell BSs in the first step.

Step S406, after the location updating for moving across paging groups succeeds, when the anchor paging controller needs to page the terminal, it sends a paging message to the BSs in the paging group 2 according to paging parameters of the paging group 2, and the terminal monitors the paging message under the BS3 according to the paging parameters of the paging group 2.

Industrial Applicability

The present invention implements location updating at the network side by determining in advance the location of the terminal. Each time the terminal is in the overlapping area of paging groups, an updating flow is triggered and location updating is performed. Thereby, success ratio of paging the terminal is increased greatly and reliability of the paging scope is ensured as well.

What we claim is:

1. A method for increasing paging success ratio in a broadband wireless communication system, comprising the following steps of:
   when a terminal determines that the terminal has moved into an overlapping area of a plurality of paging groups including an original paging group, the terminal initiating a location updating flow to a current serving base station;
   in the location updating flow, an anchor paging controller updating location information of the terminal and including the current serving base station and adjacent cell base stations thereof in a paging scope;
   after the location updating initiated in the overlapping area succeeds and before location updating for moving across paging groups succeeds, the terminal monitoring a paging message according to paging parameters of the original paging group; and
   when the anchor paging controller is required to page the terminal, the anchor paging controller initiating paging to a plurality of base stations including the current serving base station and adjacent cell base stations thereof according to the paging parameters of the original paging group.

2. The method according to claim 1, further comprising:
   in the location updating flow initiated in the overlapping area, the anchor paging controller adding information of paging groups other than the original paging group in the plurality of paging groups into the location information of the terminal; and
   after the location updating initiated in the overlapping area succeeds and before the location updating for moving across paging groups succeeds, when the anchor paging controller is required to page the terminal, the anchor paging controller initiating paging to base stations in the plurality of paging groups according to the paging parameters of the original paging group.

3. The method according to claim 2, wherein the method divides into the following steps of:
   (a) the terminal moving from a base station $BS_A$ belonging to a paging group A to coverage of another base station $BS_{AB}$; if determining that the terminal is currently in an overlapping area of the original paging group A and a paging group set B including one or more new paging groups according to a monitored downlink broadcast message from the current serving base station $BS_{AB}$, then the terminal triggering a location updating flow;

(b) in the location updating flow, the base station $BS_{AB}$ sending a location updating request message to the anchor paging controller of the terminal, and after the anchor paging controller receives the location updating request message, the anchor paging controller adding information of the paging group included in the paging group set B into the location information of the terminal, while retaining an identification and paging parameters of the paging group A;

(c) after the location updating initiated in the overlapping area succeeds and before the terminal initiates the location updating for moving across paging groups and the location updating for moving across paging groups succeeds, the terminal still monitoring the paging message according to the paging parameters of the paging group A, and when the anchor paging controller is required to page the terminal, the anchor paging controller initiating paging to the base station in the paging group A and the base station in the paging group included in the paging group set B recorded in the location information of the terminal according to the paging parameters of the paging group A.

4. The method according to claim 3, further comprising:
in the step (b), adding a parameter of paging group identifications (PGIDs) into the location updating request message sent by the base station $BS_{AB}$, the parameter including at least the identification of the paging group included in the paging group set B, and after the anchor paging controller receives the location updating request message, the anchor paging controller adding the identification of the paging group included in the paging group set B into the location information of the terminal; or
in the step (b), the location updating request message sent by the base station $BS_{AB}$ not including the identification of paging group B, and when the anchor paging controller determines that the base station $BS_{AB}$ belongs to both the original paging group A and the paging group set B according to information of paging groups to which the base station belongs, or when a relay paging controller for delivering messages between the base station $BS_{AB}$ and the anchor paging controller determines which paging groups the base station $BS_{AB}$ belongs to and informs the anchor paging controller, the anchor paging controller adding the identification of the paging group included in the paging group set B into the location information of the terminal.

5. The method according to claim 3, wherein the location updating flow triggered by the terminal in the overlapping area divides into the following steps of:
the terminal sending a ranging message to the current serving base station, and triggering the location updating flow;
after receiving the ranging message, the current serving base station sending a location updating request message to the anchor paging controller directly or via a relay paging controller;
after receiving the location updating request message, the anchor paging controller returning a location updating response message to the current serving base station directly or via the relay paging controller, updating the location information of the terminal, and including the current serving base station and the adjacent cell base stations thereof in the paging scope, while retaining the identification and paging parameters of the original paging group of the terminal;
after receiving the location updating response message, the current serving base station returning a location updating acknowledgment message to the anchor paging controller, and returning a result of the location updating to the terminal through a ranging response message.

6. The method according to claim 2, further comprising:
when the terminal moves into coverage of another base station, the terminal monitoring a downlink broadcast message from the current serving base station, and if determining that there are identifications of a plurality of paging groups including the original paging group in a paging group list in the downlink broadcast message, then determining that the terminal is currently in an overlapping area of a plurality of paging groups including a paging group A, and then triggering a location updating flow actively.

7. The method according to claim 2, further comprising:
after moving from said overlapping area to coverage of a base station not belonging to the original paging group, the terminal initiating a location updating flow for moving across paging groups, and in the location updating flow, the anchor paging controller updating the paging group and paging parameters of the terminal with the paging group to which the current serving base station belongs and paging parameters thereof; and
after the location updating succeeds, the terminal monitoring the paging message according to the paging parameters of the new paging group, and when the anchor paging controller pages the terminal, the anchor paging controller initiating paging to the base station in the new paging group according to the paging parameters of the new paging group.

8. The method according to claim 2, wherein,
when the anchor paging controller pages the terminal, the paging message is sent in a single step in which a part of the base stations in the paging scope are paged at one time, or the paging message is sent in multiple steps in which all base stations in the paging scope are paged at one time.

9. The method according to claim 2, wherein the method is applied in a worldwide interoperability for microwave access (WiMAX) system.

10. The method according to claim 1, further comprising:
in the location updating flow initiated in the overlapping area, the anchor paging controller adding information for identifying the current serving base station of the terminal and the adjacent cell base stations thereof into the location information of the terminal; and
after the location updating initiated in the overlapping area succeeds and before the location updating for moving across paging groups succeeds, when the anchor paging controller is required to page the terminal, the anchor paging controller initiating paging to the base station in the original paging group and said adjacent cell base stations according to the paging parameters of the original paging group.

11. The method according to claim 10, wherein the method divides into the following steps of:
(a) the terminal moving from a base station $BS_A$ belonging to a paging group A to coverage of another base station $BS_{AB}$, and if determining that the terminal is currently in an overlapping area of a plurality of paging groups including the original paging group A according to a monitored downlink broadcast message from the current serving base station $BS_{AB}$, then the terminal triggering a location updating flow;

(b) in the location updating flow, the base station $BS_{AB}$ sending a location updating request message to the anchor paging controller of the terminal, and after the anchor paging controller receives the location updating request message, the anchor paging controller adding information of the base station $BS_{AB}$ and adjacent cell base stations thereof into the location information of the terminal, while retaining an identification and paging parameters of the paging group A; and (c) after the location updating initiated in the overlapping area succeeds and before the terminal initiates the location updating for moving across paging groups and the location updating for moving across paging groups succeeds, the terminal still monitoring the paging message according to the paging parameters of the paging group A, and when the anchor paging controller is required to page the terminal, the anchor paging controller initiating paging to the base station in the paging group A and the adjacent cell base stations of the base station $BS_{AB}$ according to the paging parameters of the paging group A.

12. The method according to claim 11, further comprising:
in the step (b), adding a parameter of adjacent cell base station identifications (BSIDs) into the location updating request message sent by the base station $BS_{AB}$, the parameter including at least adjacent cell BSIDs of the base station $BS_{AB}$, and after the anchor paging controller receives the location updating request message, the anchor paging controller adding said adjacent cell BSIDs into the location information of the terminal; or
in the step (b), the location updating request message sent by the base station $BS_{AB}$ not including adjacent cell BSIDs of the base station $BS_{AB}$, and when the anchor paging controller acquires the adjacent cell BSIDs of the base station $BS_{AB}$ by searching according to a topological relationship of base stations, or when a relay paging controller for delivering messages between the base station $BS_{AB}$ and the anchor paging controller acquires the adjacent cell BSIDs of the base station $BS_{AB}$ by searching and informs the anchor paging controller, the anchor paging controller adding the identification of the base station $BS_{AB}$ and the adjacent cell BSIDs thereof into the location information of the terminal.

13. The method according to claim 11, wherein the location updating flow triggered by the terminal in the overlapping area divides into the following steps of:
the terminal sending a ranging message to the current serving base station, and triggering the location updating flow;
after receiving the ranging message, the current serving base station sending a location updating request message to the anchor paging controller directly or via a relay paging controller;
after receiving the location updating request message, the anchor paging controller returning a location updating response message to the current serving base station directly or via the relay paging controller, updating the location information of the terminal, and including the current serving base station and the adjacent cell base stations thereof in the paging scope, while retaining the identification and paging parameters of the original paging group of the terminal;
after receiving the location updating response message, the current serving base station returning a location updating acknowledgment message to the anchor paging controller, and returning a result of the location updating to the terminal through a ranging response message.

14. The method according to claim 10, further comprising:
when the terminal moves into coverage of another base station, the terminal monitoring a downlink broadcast message from the current serving base station, and if determining that there are identifications of a plurality of paging groups including the original paging group in a paging group list in the downlink broadcast message, then determining that the terminal is currently in an overlapping area of a plurality of paging groups including a paging group A, and then triggering a location updating flow actively.

15. The method according to claim 10, further comprising:
after moving from said overlapping area to coverage of a base station not belonging to the original paging group, the terminal initiating a location updating flow for moving across paging groups, and in the location updating flow, the anchor paging controller updating the paging group and paging parameters of the terminal with the paging group to which the current serving base station belongs and paging parameters thereof; and
after the location updating succeeds, the terminal monitoring the paging message according to the paging parameters of the new paging group, and when the anchor paging controller pages the terminal, the anchor paging controller initiating paging to the base station in the new paging group according to the paging parameters of the new paging group.

16. The method according to claim 10, wherein,
when the anchor paging controller pages the terminal, the paging message is sent in a single step in which a part of the base stations in the paging scope are paged at one time, or the paging message is sent in multiple steps in which all base stations in the paging scope are paged at one time.

17. The method according to claim 10, wherein the method is applied in a worldwide interoperability for microwave access (WiMAX) system.

18. The method according to claim 1, further comprising:
when the terminal moves into coverage of another base station, the terminal monitoring a downlink broadcast message from the current serving base station, and if determining that there are identifications of a plurality of paging groups including the original paging group in a paging group list in the downlink broadcast message, then determining that the terminal is currently in an overlapping area of a plurality of paging groups including a paging group A, and then triggering a location updating flow actively.

19. The method according to claim 1, further comprising:
after moving from said overlapping area to coverage of a base station not belonging to the original paging group, the terminal initiating a location updating flow for moving across paging groups, and in the location updating flow, the anchor paging controller updating the paging group and paging parameters of the terminal with the paging group to which the current serving base station belongs and paging parameters thereof; and
after the location updating succeeds, the terminal monitoring the paging message according to the paging parameters of the new paging group, and when the anchor paging controller pages the terminal, the anchor paging controller initiating paging to the base station in the new paging group according to the paging parameters of the new paging group.

20. The method according to claim 1, wherein,
when the anchor paging controller pages the terminal, the paging message is sent in a single step in which a part of the base stations in the paging scope are paged at one time, or the paging message is sent in multiple steps in which all base stations in the paging scope are paged at one time.

21. The method according to claim 1, wherein the method is applied in a worldwide interoperability for microwave access (WiMAX) system.

\* \* \* \* \*

UNITED STATES PATENT AND TRADEMARK OFFICE
CERTIFICATE OF CORRECTION

| | | |
|---|---|---|
| PATENT NO. | : 8,200,254 B2 | Page 1 of 1 |
| APPLICATION NO. | : 12/809787 | |
| DATED | : June 12, 2012 | |
| INVENTOR(S) | : Wang et al. | |

It is certified that error appears in the above-identified patent and that said Letters Patent is hereby corrected as shown below:

On the title page item (54) and column 1, line 2, please correct the word "BANDWITH" to "BANDWIDTH"

Signed and Sealed this
Twenty-fifth Day of September, 2012

David J. Kappos
*Director of the United States Patent and Trademark Office*